(12) United States Patent
Lai

(10) Patent No.: US 7,393,125 B1
(45) Date of Patent: Jul. 1, 2008

(54) COMBINATION OF BICYCLE FRAME AND BATTERY

(75) Inventor: Chih-Hsiung Lai, Taichung County (TW)

(73) Assignee: Ideal Bike Corp., Taichung County (TW)

( * ) Notice: Subject to any disclaimer, the term of this patent is extended or adjusted under 35 U.S.C. 154(b) by 0 days.

(21) Appl. No.: 11/783,308

(22) Filed: Apr. 9, 2007

(51) Int. Cl.
*F21V 33/00* (2006.01)

(52) U.S. Cl. .................. 362/473; 280/281.14; 280/284; 280/288.4

(58) Field of Classification Search .............. 280/281.1, 280/284, 288.4; 362/473
See application file for complete search history.

(56) References Cited

U.S. PATENT DOCUMENTS

| | | | | |
|---|---|---|---|---|
| 4,814,951 A * | 3/1989 | Larsen | ....................... | 362/473 |
| 4,901,209 A * | 2/1990 | Nitz | ............................ | 362/473 |
| 5,217,241 A * | 6/1993 | Girvin | ......................... | 280/284 |
| 5,618,052 A * | 4/1997 | Rendall | .................... | 280/288.4 |
| 5,823,653 A * | 10/1998 | Elam et al. | ................... | 362/473 |
| 5,833,534 A * | 11/1998 | Lai | ............................. | 362/473 |
| 6,158,881 A * | 12/2000 | Carne | ......................... | 362/473 |

* cited by examiner

*Primary Examiner*—Hargobind S Sawhney

(57) ABSTRACT

A recess is defined in one of the top tube, the down tube and the seat tube of a bicycle frame and a power supply unit is engaged with the recess. The power supply unit includes an engaging frame engaged with the recess and a battery is removably engaged with a main space defined in the engaging frame. The engaging frame includes a chamber defined in an end thereof and a control box is received in the chamber so as to be electrically connected with the control box. The top surface of the battery is in flush with the one of the top tube, the down tube and the seat tube. An ON/OFF switch is installed on a top of the engaging frame and an indication bulb is installed on a top of the battery for convenience of observation by the user.

8 Claims, 6 Drawing Sheets

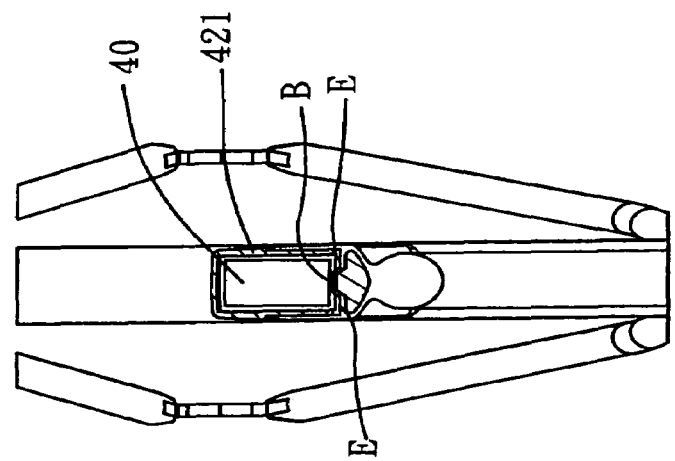
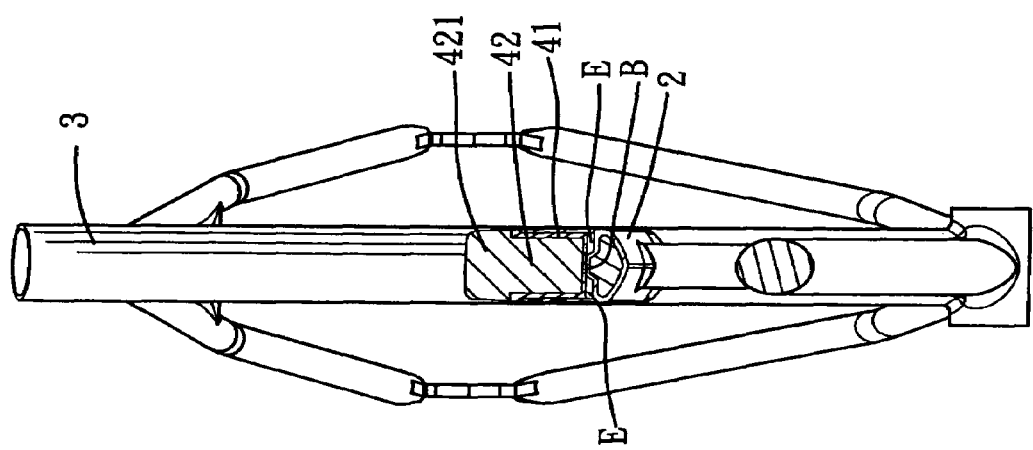

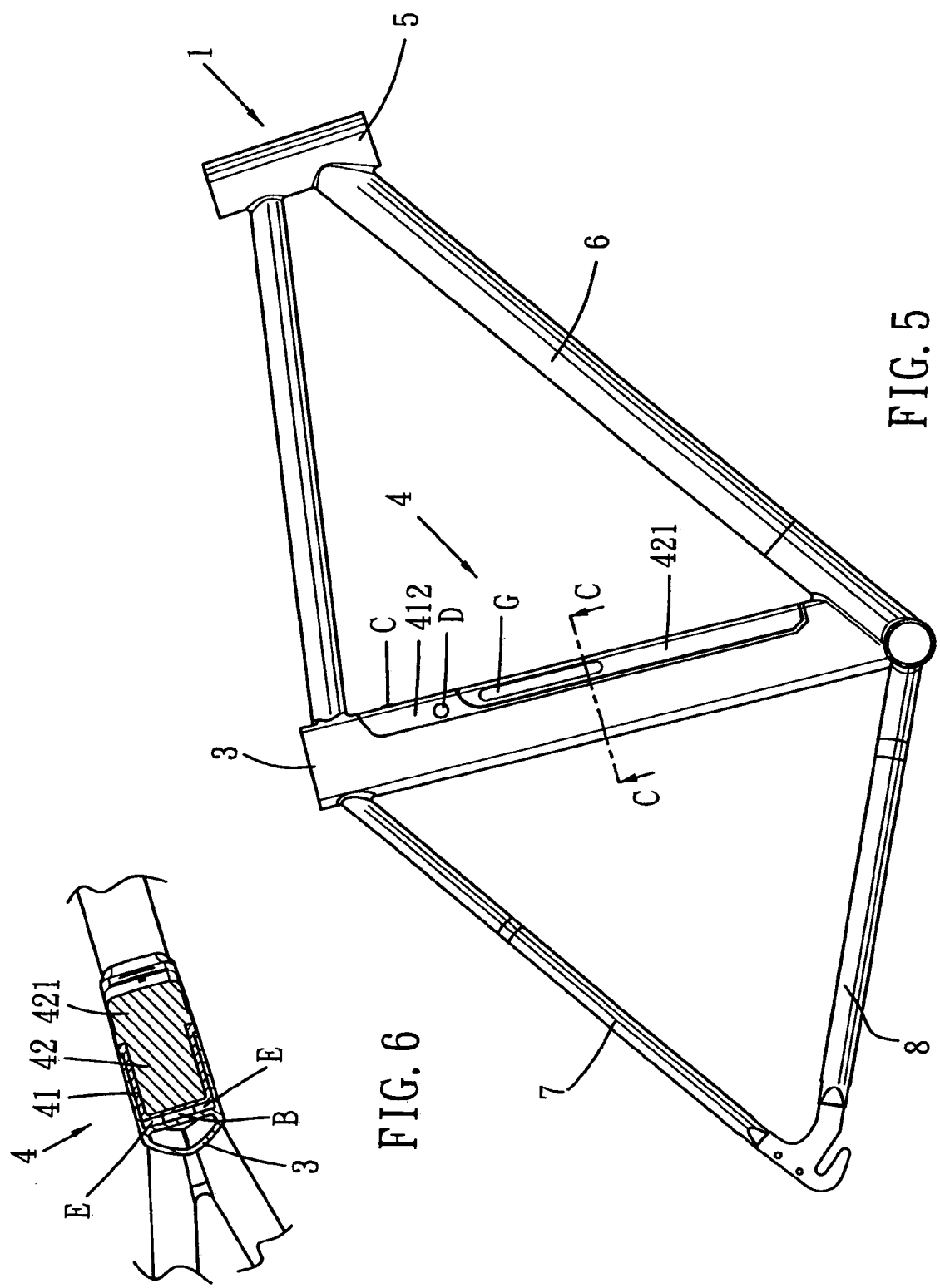

COMBINATION OF BICYCLE FRAME AND BATTERY

BACKGROUND OF THE INVENTION (1) Field of the Invention

The present invention relates to a bicycle frame and a battery for driving the bicycle is received in the top tube or seat tube of the bicycle frame.

(2) Description of the Prior Art

A conventional electric bicycle generally includes a rack connected with the axle of the rear wheel and the seat stays, and a battery is supported on the rack so as to provide electric power to drive the bicycle. Some bicycle manufacturers set the rack on a side of the frame. The battery and the rack obviously make the outer appearance of the bicycle frame to be awkward.

The present invention intends to provide a bicycle frame which has a rectangular top tube or seat post and the battery is received in the top tube or the seat post. The top surface of the battery is in flush with the outer surface of the top tube or the seat post.

SUMMARY OF THE INVENTION

The present invention relates to a combination of a battery and a bicycle frame, wherein the bicycle frame includes a head tube, a top tube and a down tube extending from the head tube, a seat tube connected to the top tube and the down tube, and two seat stays and two chain stays connected to the seat tube. One of the top tube, the down tube and the seat tube has a recess defined therein. A power supply unit includes an engaging frame engaged with the recess and a battery is removably engaged with a main space defined in the engaging frame. The engaging frame includes a chamber defined in an end thereof and a control box is received in the chamber. The battery is electrically connected with the control box.

The primary object of the present invention is to provide a battery-powered bicycle frame with a recess defined in one of the top tube, the down tube and the seat tube, and the power supply unit including a battery is engaged with the recess.

The present invention will become more obvious from the following description when taken in connection with the accompanying drawings which show, for purposes of illustration only, a preferred embodiment in accordance with the present invention.

BRIEF DESCRIPTION OF THE DRAWINGS

FIG. 3A is a cross sectional view along line A-A in FIG. 3;

FIG. 3B is a cross sectional view along line B-B in FIG. 3;

FIG. 5 is a side view to show that the power supply unit is installed in the seat tube of the bicycle frame of the present invention, and FIG. 6 is a cross sectional view along line C-C in FIG. 5.

DETAILED DESCRIPTION OF THE PREFERRED EMBODIMENTS

Figure 1:
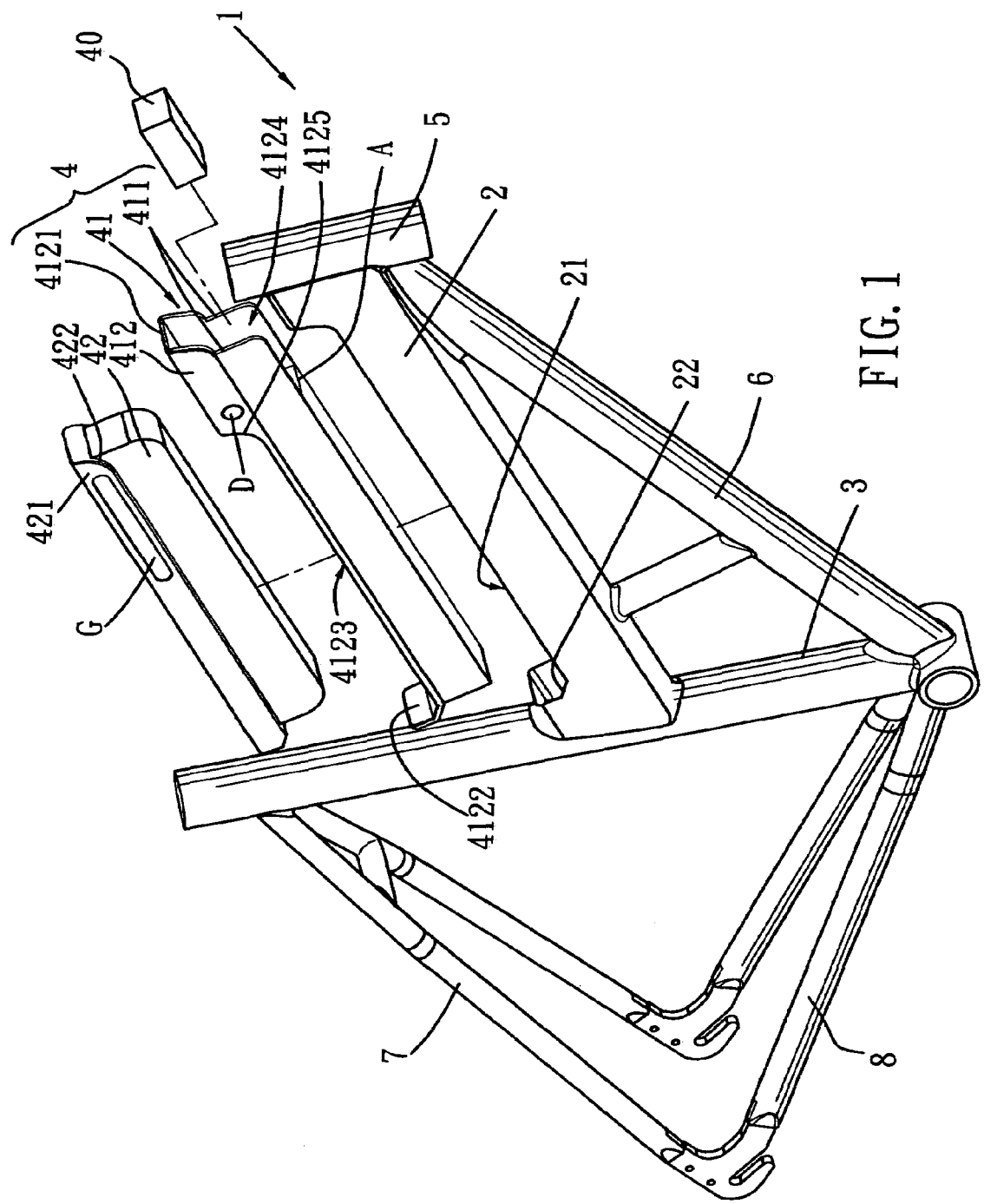
FIG. 1 is an exploded view to show the bicycle frame and the power supply unit of the present invention.
Figure 2:
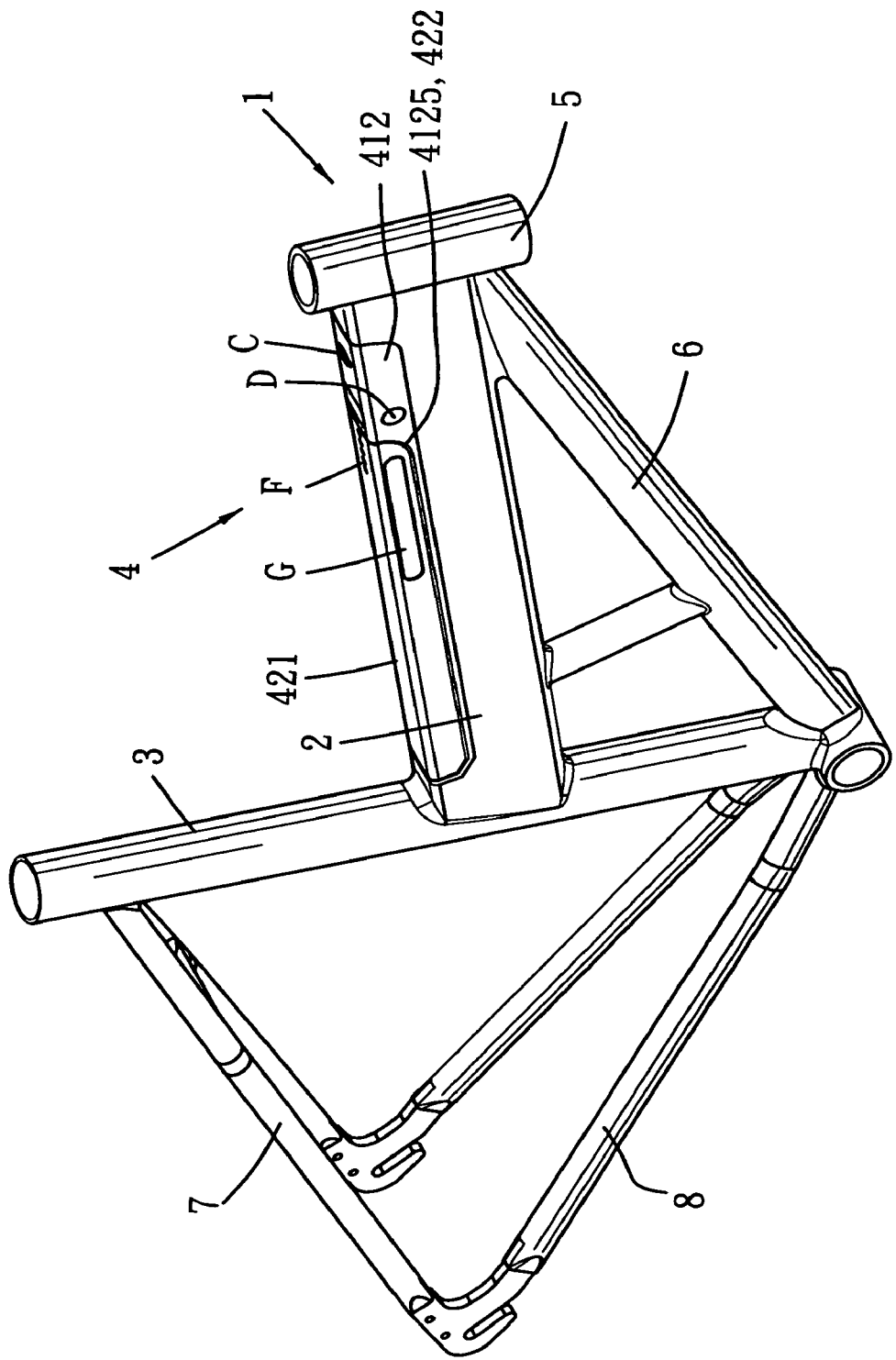
FIG. 2 is a perspective view to show that the power supply unit is installed in the top tube of the bicycle frame of the present invention.
Figure 3:
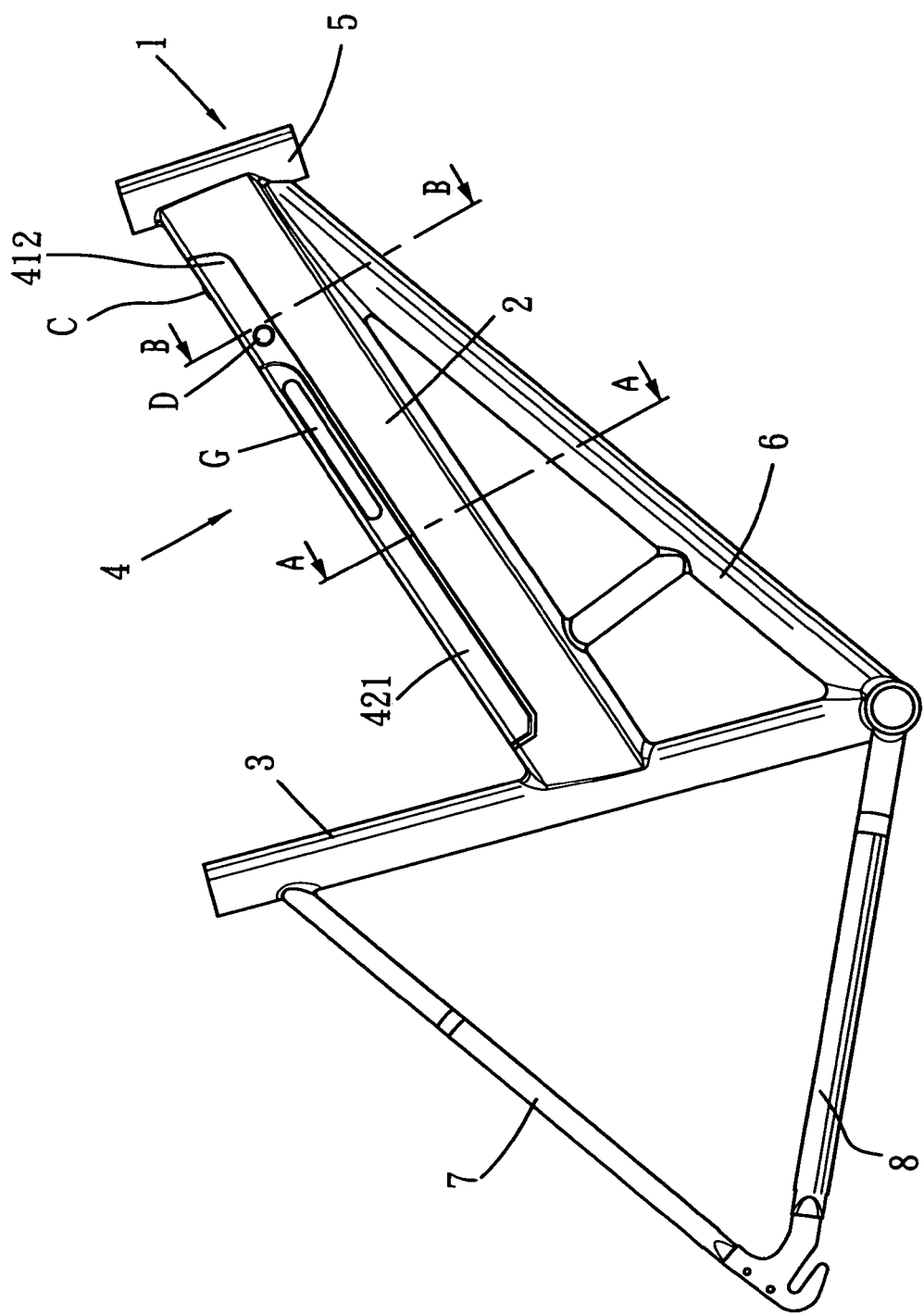
FIG. 3 is a side view to show that the power supply unit is installed in the top tube of the bicycle frame of the present invention.

Referring to FIGS. 1 to 3, the battery-powered bicycle frame 1 of the present invention comprises a head tube 5, a top tube 2 and a down tube 6 extending from the head tube 5, a seat tube 3 connected to the top tube 2 and the down tube 6, and two seat stays 7 and two chain stays 8 connected to the seat tube 3. The top tube 2 has a recess 21 defined therein and the recess 21 is defined by two sidewalls and each sidewall includes a low-cut top edge so as to form two inclined upward edges 22 on two ends thereof.

A power supply unit 4 includes an engaging frame 41 engaged with the recess 21 and a battery 42 is removably engaged with a main space 4123 defined in the engaging frame 41. The engaging frame 41 includes two sidewalls 411 between which the main space 4123 is defined, and an end plate 4122 and an U-shaped portion 412 respectively extend from two ends of the engaging frame 41. Each of the end plate 4122 and the U-shaped portion 412 includes an inclined lower edge which is matched with and supported by the inclined upward edge 22 of the sidewall defining the recess 21. A separation board "A" is connected between the two sidewalls 411 of the engaging frame 41 so as to define a chamber 4124 between the two sidewalls 411 and the U-shaped portion 412 in the engaging frame 41. A control box 40 is received in the chamber 4124 and electrically connected with the battery 42. An ON/OFF switch "C" is installed on a top surface 4121 of the U-shaped portion 412. A battery cap 421 is mounted on a top of the battery 42 and two sides of the battery cap 421 protrude from two sides of the battery 42. Two sides of the battery cap 421 have two respective inclined lower edge 422 which are respectively matched with and supported on an inclined end 4125 formed at an end of the U-shaped portion 412 and an inclined surface of the end plate 4122, such that a top surface of the battery cap 421 is in flush with a top surface of the U-shaped portion 412 and the top surface of the top tube 2. A release button "D" is installed on one of the two sides of the U-shaped portion 412 so as to release the battery from the main space 4123 conveniently. The top surface of the battery cap 421 includes an indication bulb "F" to show status of operation of the battery 42 and a groove "G" is defined in each of two sides of the battery cap 421 so that the user can easily grab the battery 42 when replacing the battery 42.

As shown in FIGS. 3A and 3B, a ridge "B" extends upward from an inner end of the recess 21 so as to define gaps "E" between the ridge "B", the inner end of the recess 21 and a bottom of the battery 42. Wires connected between the control box 40 and the battery 42 may extend through the gaps "E".

The battery 42 can be easily installed and removed from the top tube 2 of the bicycle frame 1 and the whole assembly has a smooth linear appearance which makes the bicycle frame 1 to meet requirements from esthetic point of view.

Figure 4:
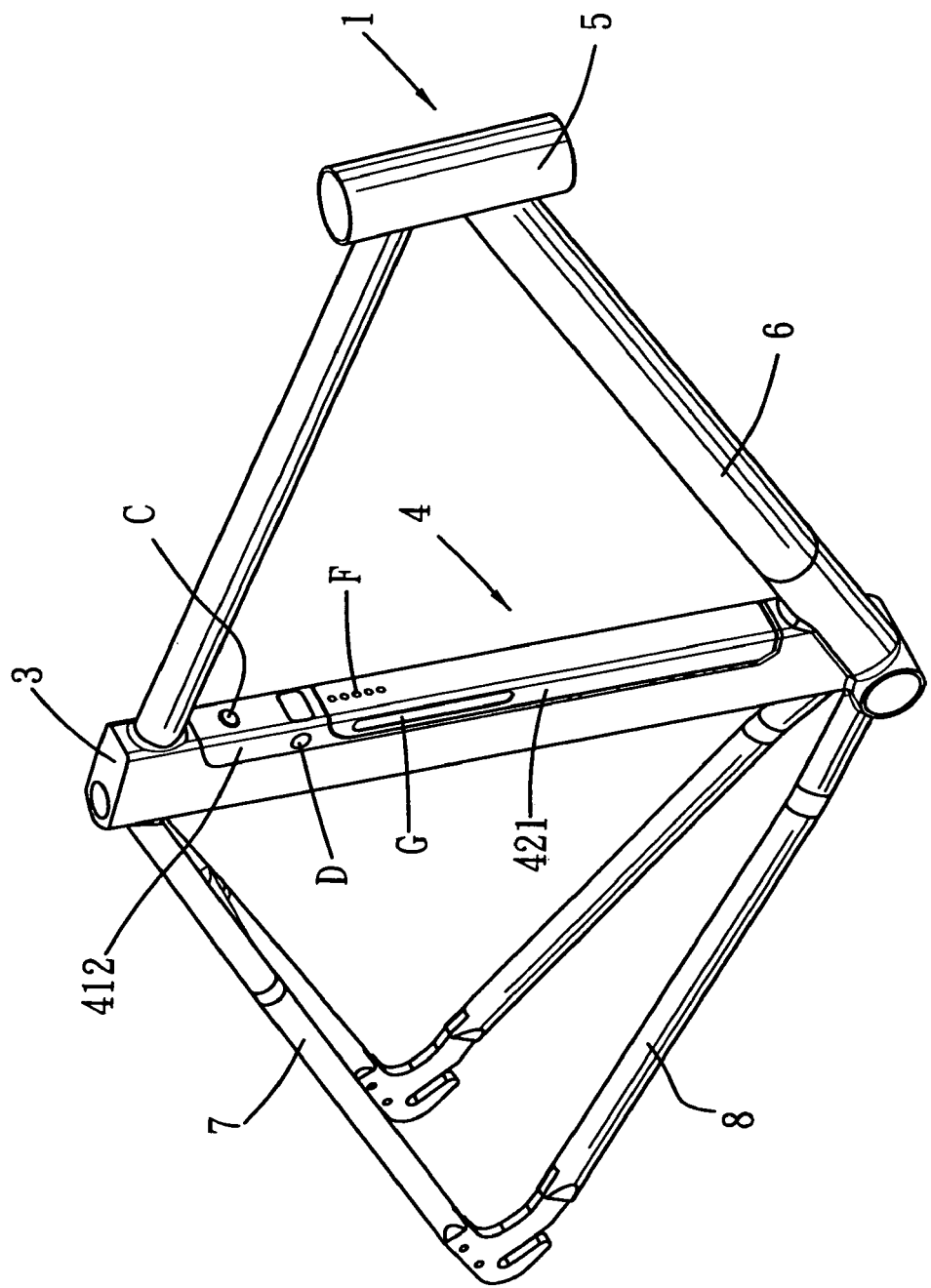
FIG. 4 is a perspective view to show that the power supply unit is installed in the seat tube of the bicycle frame of the present invention.

FIGS. 4 to 6 show that the power supply unit 4 can be engaged with the recess defined in the seat tube 3 and the ridge "B" extends from the underside of the power supply unit 4, and the ridge "B" contacts the inner end of the recess to define gaps "E" as well to allow the wires to go through the gaps "E".

While we have shown and described the embodiment in accordance with the present invention, it should be clear to those skilled in the art that further embodiments may be made without departing from the scope of the present invention.

What is claimed is:

1. A bicycle frame comprising:
   (a) a head tube attached to a proximal end of a top tube, said top tube having an opening, and said top tube having a recess;
   (b) said recess defined by two sidewalls of the top tube, a down tube, and a seat tube;
   (c) said top tube sidewalls so configured to define a top sidewall edge including a low-cut top edge so as to form two inclined upward edges at or near the proximal and distal ends of the top tube;
   (d) said down tube having a proximal end and a distal end, and is further attached at the proximal end to the head tube;
   (e) said seat tube having a proximal end and a distal end, wherein the seat tube is connected to the distal end of top tube and the distal end of the down tube;
   (f) power supply unit comprising an engaging frame having a proximal end and a distal end and so configured to cooperatively engage the top tube opening, wherein said opening provides access to the recess in the top tube, further, said engaging frame possess a plurality of engaging frame sidewalls, wherein said engaging frame side walls define a main space;
   (g) the main space further includes an end plate extending from the distal end of the engaging frame, and a U-shaped portion, extending from the proximal end of the engaging frame, each of the end plates and the U-shaped portions include an inclined lower edge which is matched with and supported by the inclined upward edge of the top tube sidewall edge defining the recess;
   (h) the engaging frame includes a chamber defined in said proximal end or said distal end thereof and a control box received in the chamber;
   (i) a battery is removably engaged with said main space defined in the engaging frame, further, the battery is electrically connected with the control box.

2. The bicycle frame as claimed in claim 1, wherein a separation board is connected between the two sidewalls of the engaging frame so as to define the chamber in the engaging frame.

3. The bicycle frame as claimed in claim 1, wherein a switch is installed on a top surface of the U-shaped portion.

4. The bicycle frame as claimed in claim 1, wherein a release button is installed on one of the two sides of the U-shaped portion so as to release the battery from the main space.

5. The bicycle frame as claimed in claim 1, wherein a battery cap is mounted on a top of the battery and two sides of the battery cap protrude from two sides of the battery, two sides of the battery cap have two respective inclined lower edges which are respectively matched with and supported by an inclined end formed at an end of the U-shaped portion and an inclined surface of the end plate, such that a top surface of the battery cap is in flush with a top surface of the U-shaped portion.

6. The bicycle frame as claimed in claim 5, wherein the top surface of the battery cap includes an indication bulb to show status of operation of the battery.

7. The bicycle frame as claimed in claim 5, wherein a groove is defined in each of two sides of the battery cap.

8. The bicycle frame as claimed in claim 1, wherein a ridge extends upward from an inner end of the recess so as to define gaps between the ridge, the inner end of the recess and a bottom of the battery.

* * * * *